(12) United States Patent
Aoki et al.

(10) Patent No.: US 7,937,982 B2
(45) Date of Patent: May 10, 2011

(54) HARD DISK DESTRUCTION APPARATUS AND METHOD

(75) Inventors: Carl Aoki, Eden Prairie, MN (US);
David Weese, Brooklyn Park, MN (US);
Joshua McCombs, Eagan, MN (US);
Bradley Parker, Farmington, MN (US);
Joe Sexton, Minneapolis, MN (US);
Robert Stephens, Minneapolis, MN (US); Duane Peterson, Coon Rapids, MN (US); Andrew Strom, Bloomington, MN (US); Tito Perfecto, Coon Rapids, MN (US); Gary Griner, St. Louis Park, MN (US); Kathleen Maurer, Louisville, KY (US); Abelardo Acuña, Louisville, KY (US); Brian Hanson, Farmington, MN (US); Michael Wegehaupt, Louisville, KY (US); Chris Nalezny, Maplewood, MN (US); James D. Christophel, Louisville, KY (US)

(73) Assignee: BBY Solutions, Inc., Richfield, MN (US)

( * ) Notice: Subject to any disclaimer, the term of this patent is extended or adjusted under 35 U.S.C. 154(b) by 418 days.

(21) Appl. No.: 11/983,299

(22) Filed: Nov. 8, 2007

(65) Prior Publication Data
US 2008/0250948 A1 Oct. 16, 2008

Related U.S. Application Data

(60) Provisional application No. 60/922,740, filed on Apr. 10, 2007.

(51) Int. Cl.
*B21D 31/02* (2006.01)

(52) U.S. Cl. ............... 72/325; 72/455; 72/479; 241/169
(58) Field of Classification Search ............... 72/325, 72/326, 332, 412, 455, 462, 476, 479; 241/169, 241/169.2; 720/718
See application file for complete search history.

(56) References Cited

U.S. PATENT DOCUMENTS

| | | | | |
|---|---|---|---|---|
| 2,506,970 A | * | 5/1950 | Paul | 99/581 |
| 2,572,378 A | * | 10/1951 | Paul | 99/581 |
| 4,694,996 A | * | 9/1987 | Siegel | 241/100 |
| 6,039,637 A | | 3/2000 | Hutchison et al. | |
| 6,189,446 B1 | | 2/2001 | Olliges et al. | |

(Continued)

FOREIGN PATENT DOCUMENTS

JP    2005-85412    *    3/2005

(Continued)

OTHER PUBLICATIONS

Intelligent Decisions, Disk Sanitization and Destruction Services from Intelligent Decisions, www.intelligent.net, 2006.

(Continued)

*Primary Examiner* — Edward Tolan
(74) *Attorney, Agent, or Firm* — Beck & Tysver PLLC

(57) ABSTRACT

A hard disk destruction apparatus is presented having a penetrating point that is manually pressed against a hard disk. The point has an angled tip designed to penetrate the hard disk casing and deform the hard disk platters within. The manual pressing avoids the use of any electrical power or other fuel. In one described embodiment, a mechanical arbor press provides the necessary force. A transparent safety shield surrounds the hard disk during destruction. A restraint prevents upward movement of the hard disk when the point is extracted.

20 Claims, 6 Drawing Sheets

U.S. PATENT DOCUMENTS

| | | | |
|---|---|---|---|
| 6,334,582 B1 | 1/2002 | Castronovo | |
| 6,685,119 B2 | 2/2004 | Castronovo | |
| 6,722,240 B1 * | 4/2004 | Weng | 83/167 |
| 7,134,940 B2 * | 11/2006 | Hutchison et al. | 451/36 |
| 7,374,114 B1 * | 5/2008 | Pekay et al. | 241/169 |
| 2003/0132329 A1 * | 7/2003 | Castronovo | 241/277 |
| 2004/0014404 A1 * | 1/2004 | Miller | 451/63 |
| 2005/0132394 A1 * | 6/2005 | Rotelli | 720/719 |
| 2006/0086855 A1 | 4/2006 | Castronovo | |
| 2006/0124046 A1 | 6/2006 | Heffner | |
| 2006/0124785 A1 | 6/2006 | Castronovo | |
| 2006/0136752 A1 | 6/2006 | Miller et al. | |
| 2007/0147776 A1 * | 6/2007 | Ito | 386/94 |
| 2008/0061177 A1 * | 3/2008 | Ito | 241/285.1 |

FOREIGN PATENT DOCUMENTS

| | | | |
|---|---|---|---|
| JP | 2006-4581 | * | 1/2006 |

OTHER PUBLICATIONS

Kate Greene, How to Kill a Hard Drive, Technology Review 2006.

Orient Instrument Computer Co., Ltd., Hard Disk Breaker, www.orient-computer.co.ip/english2/products/en_buturi_crusher.htm, Aug. 2006.

* cited by examiner

HARD DISK DESTRUCTION APPARATUS AND METHOD

PRIORITY CLAIM

This application claims the benefit of U.S. Provisional Application No. 60/922,740, filed Apr. 10, 2007.

FIELD OF THE INVENTION

The present invention is in the field of hard disk destruction for the purpose of preventing data extraction. More particularly, the present invention relates to an apparatus and method that allows a safe, easy technique for hard disk destruction using no dangerous, powered devices.

BACKGROUND OF THE INVENTION

Data security is becoming an increasingly important issue. News reports frequently discuss the latest data leaks involving corporate or customer data. Sometimes these leaks result from a breakdown in network security, where a maleficent actor defeats existing security and is able to extract data from computers during their normal operation. Other times, the data is stored on a laptop computer that is lost or stolen. A third cause of data security breaches comes when a computer has failed or is being sold to a third party and proper care was not taken to remove all of the confidential data found on the hard disk before the computer was discarded.

While the first two causes of data security breaches have received a great deal of attention, the third cause may actually be more common. In response, many companies turn to software utilities to remove data from a hard drive before disposing of the computer. Other companies, however, insist on a higher level of security and therefore require the replacement of all hard disks in any computer that is to be sold to a third party. Where the computer is outdated or malfunctioning, the company will sell the computer for parts or simply recycle or throw away the computer. In this case, these companies will remove the hard drives containing the confidential data from the computer before disposal.

As a result, many companies and individuals are developing an undesired collection of obsolete hard drives. These drives contain, or once contained, confidential data, and therefore cannot be trusted to third parties for disposal. A need has therefore developed to destroy these drives in such a way that no data can be recovered from them. Known prior art techniques involve shredding the entire drive in a large, commercial grade shredder, re-magnetization of the drive with a large, commercial grade magnet, or crushing the drive in an electrically operated crushing machine. However, these techniques require a large capital expenditure in equipment, specialized training for operation, and often involve significant risks of injury to improperly trained operators. While the use of a magnet to remove data from a disk involves less risk of injury, many experts caution against this technique due to the difficulty in ensuring that all of the data is removed.

SUMMARY OF THE INVENTION

The present invention provides a better way for hard disk destruction. A device is used for piercing the outer shell of a computer hard disk with a penetrating point that then deforms the hard disk platters within. The point is sharp enough to pierce the outer shell with a minimal amount of force. A mechanical arbor press provides the force necessary to pierce the shell. The press uses a rotating arm to rotate a toothed cylinder against a toothed bar or ram. The toothed engagement translates the rotational movement of the arm into a vertical movement of the bar. The use of a relatively large bar allows the long rotational movement to be translated into greater force through a shorter range of motion in the toothed bar. The toothed bar terminates at the penetrating point. In the rest position, the point is positioned slightly above a hard disk. When lowered, the bar forces the point through the shell of the hard disk and into contact with the hard disk platters. Operating safety is maintained through the use of a see-through safety shield. The shield has an upper hole through which the bar and point passes, as well as a front door through which the hard disk is inserted.

DETAILED DESCRIPTION OF THE INVENTION

Figure 1:
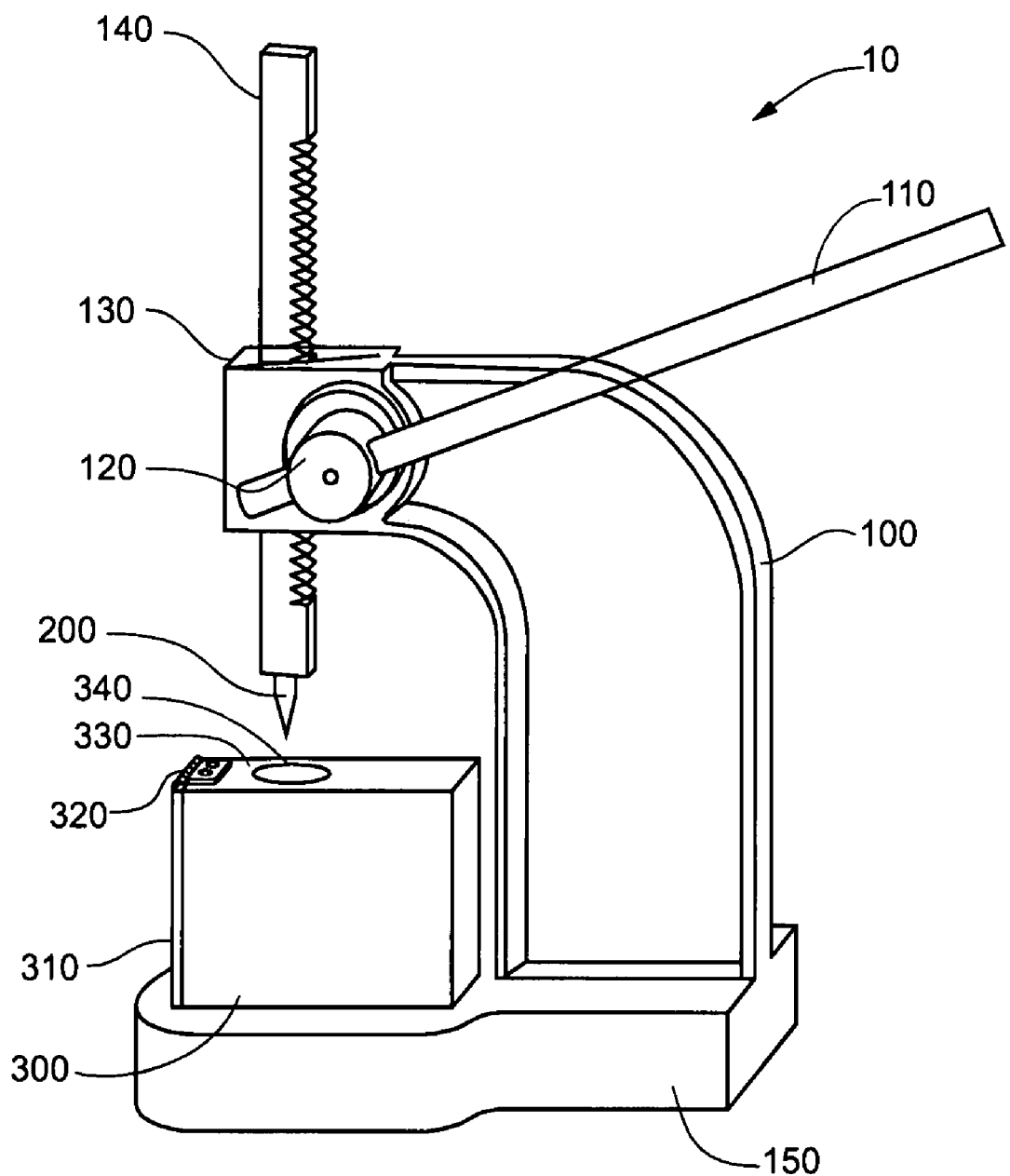
FIG. 1 is a perspective view of the present invention.
Figure 2:
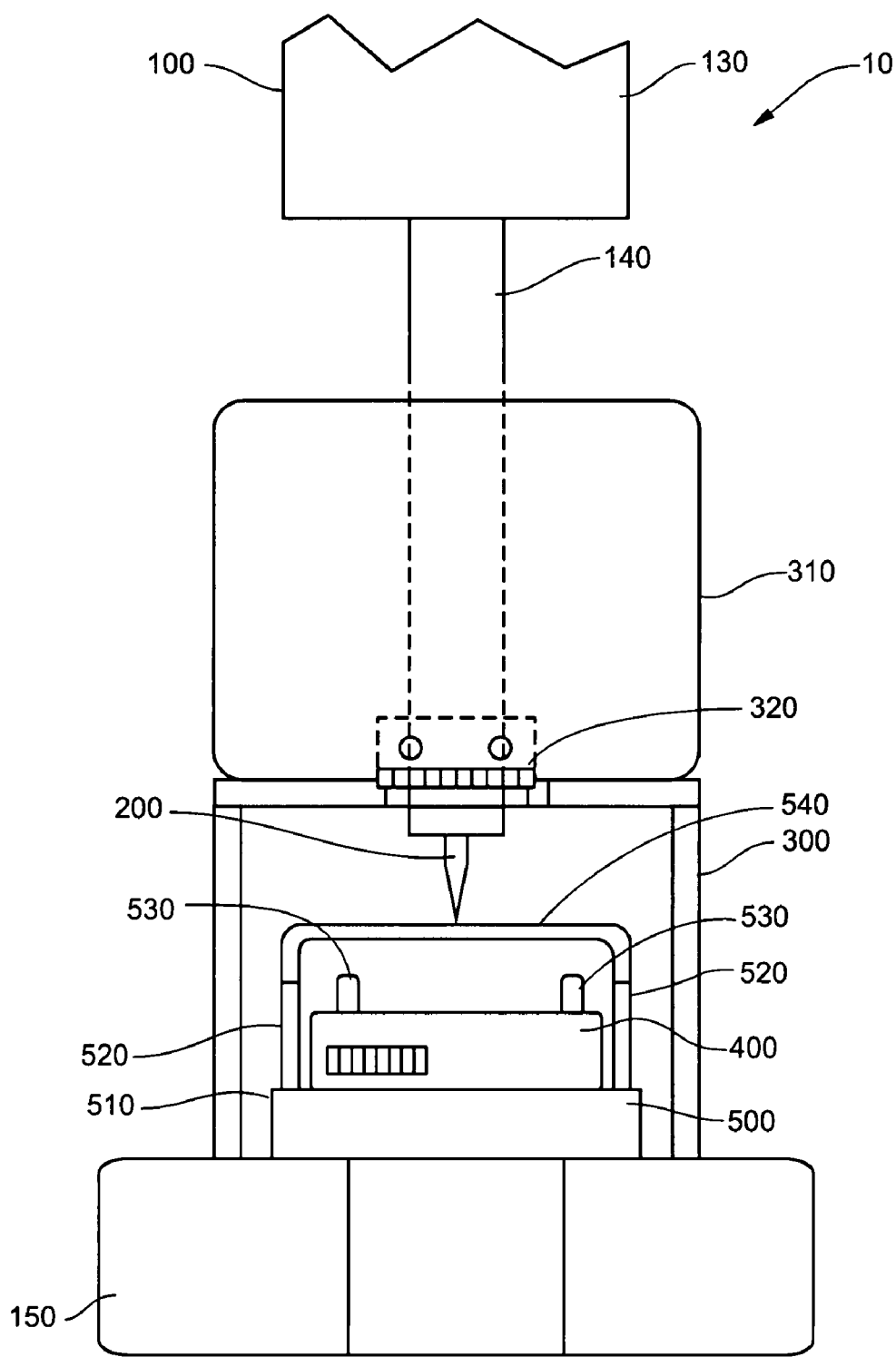
FIG. 2 is front plan view of a portion of the present invention shown in FIG. 1.

FIGS. 1 and 2 show one embodiment of a hard disk destruction apparatus 10 of the present invention. In the disclosed embodiment, an arbor press 100 is used to press a penetrating point 200 through a safety shield 300 and into a hard disk 400 (not shown in FIG. 1). The hard disk 400 is placed inside the safety shield 300, after which the arbor press 100 forces the point 200 through the outer shell of the hard disk 400 thereby rendering the data on the disk 400 unrecoverable.

Press 100

The purpose of the arbor press 100 is to create a mechanical advantage so that the point 200 is able to penetrate the hard disk 400 using minimal physical force. The mechanical advantage is created through the use of arm 110. In order to provide a more secure and more comfortable grip on arm 110, one embodiment includes the use of a handle grip (not shown) on arm 110. This handle grip can be formed out of a thin layer of foam material or tape, as is commonly used for these types of grip surfaces. The arm 110 is connected to a central toothed cylinder or pinion 120 that rotates in an upper block portion 130 of the arbor press 100. The upper block portion 130 also receives a toothed bar or ram 140, which is kept in geared engagement with the toothed cylinder 120. Counter-clockwise rotation of the arm 110 will cause the ram 140 to move downwards, thereby moving the penetrating point 200 down to and through the casing of the hard disk 400. By moving the arm 110 rotationally approximately 2-3 feet, the ram 140 will move approximately 2-3 inches. This creates a 10 to 15 times mechanical advantage, therefore allowing the present invention to be used by any able-bodied individual regardless of their physical strength. To ensure that the arbor press 100 remains stable, the arbor press 100 has a large, heavy base 150. This base 150 secures the press 100 during normal use.

However, for greater security, the base 150 can be bolted, damped, or otherwise secured to a non-movable table, workbench, or other surface.

The present invention uses the arbor press 100 because this type of press easily creates the necessary mechanical advantage while minimizing the time required to destroy disk 400. Other types of presses could be used to create the mechanical advantage without the need for any electrically operated machinery. For instance, a screw press could be used in which a winding screw mechanism presses the penetrating point 200 into the hard disk 400. A manual hydraulic press could similarly be used. In addition, other simple machines and devices that provide a mechanical advantage for inserting the point 200 into the hard disk could be used to achieve this function. One example of an effective non-press device would be a slide hammer or other impact tool known to those of skill in the art. The one disadvantage of an impact tool is that the risk of injury increases when compared to the slower, more deliberate motion involved with the operation of a manual press. Consequently, the preferred embodiment of the press 100 is a three-ton arbor press.

The present invention uses a manual pressing mechanism to avoid the use of electricity or other fuels to operate the device 10. This allows the device 10 to be placed wherever it is needed without being tied to a nearby source of power. Furthermore, by avoiding the use of powered equipment such as an electric drill or an automated hydraulic press, the safety of the device 10 is increased.

Safety Shield 300

FIG. 2 shows the hard disk 400 positioned within the safety shield 300 with the door 310 of the safety shield 300 open. This door 310 opens to allow insertion and removal of the hard disk from the safety shield enclosure 300. Although shown open in FIG. 2, in actual operation the door 310 will always remain dosed until the point 200 has been completely removed from the hard disk 400. The door 310 is attached to the remainder of the safety shield 300 by a hinge 320, although other techniques of attaching a removable door would be within the scope of the present invention. For instance, the door 310 could simply slide into an opening in the shield 300 and remain in position via a friction fit. At the top surface 330 of shield 300 is an opening 340, through which the point 200 and the toothed bar or ram 140 can enter the shield 300 and contact the hard disk 400.

The safety shield 300 is preferably made of a clear, shatter-resistant plastic, such quarter-inch thick sheets of acrylic. By allowing visibility through the shield 300, the user can watch the point 200 enter the hard disk 400 and therefore be reassured that the readability of the disk 400 has be destroyed.

Hard Disk Support Mechanism 500

Figure 3:
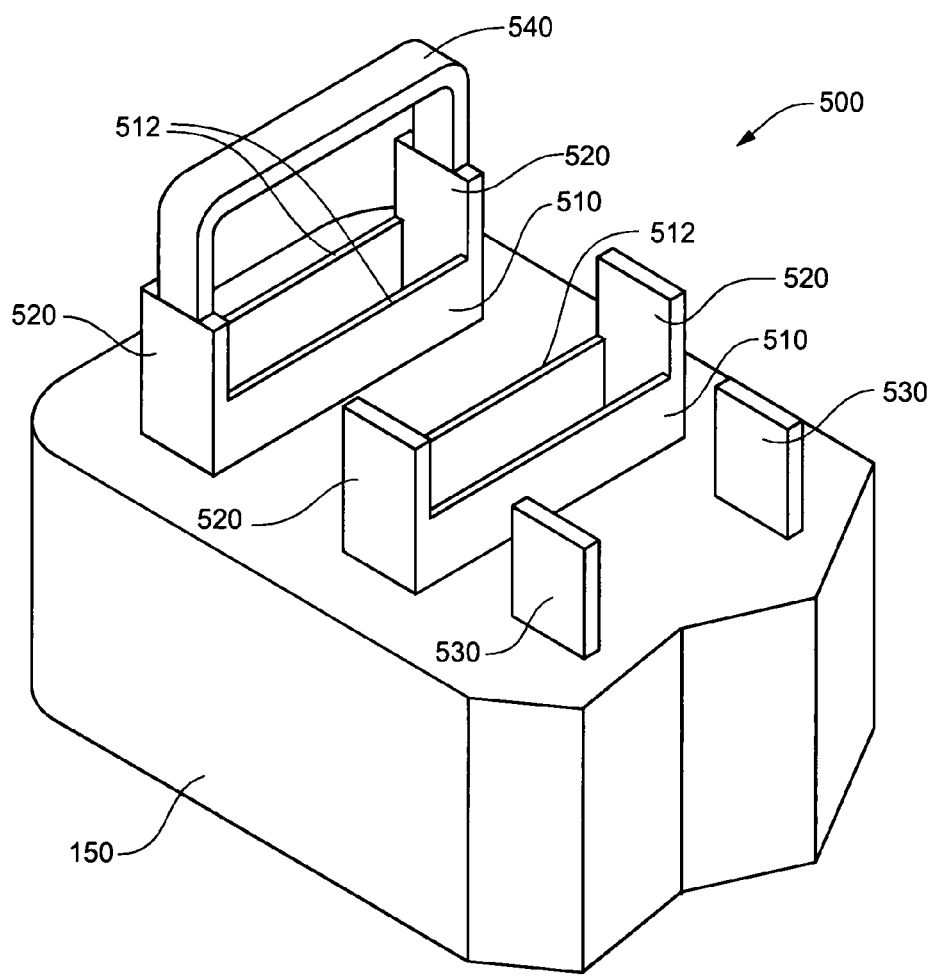
FIG. 3 is a perspective view of the hard disk support and restraining ring found under the safety shield of the present invention.
Figure 4:
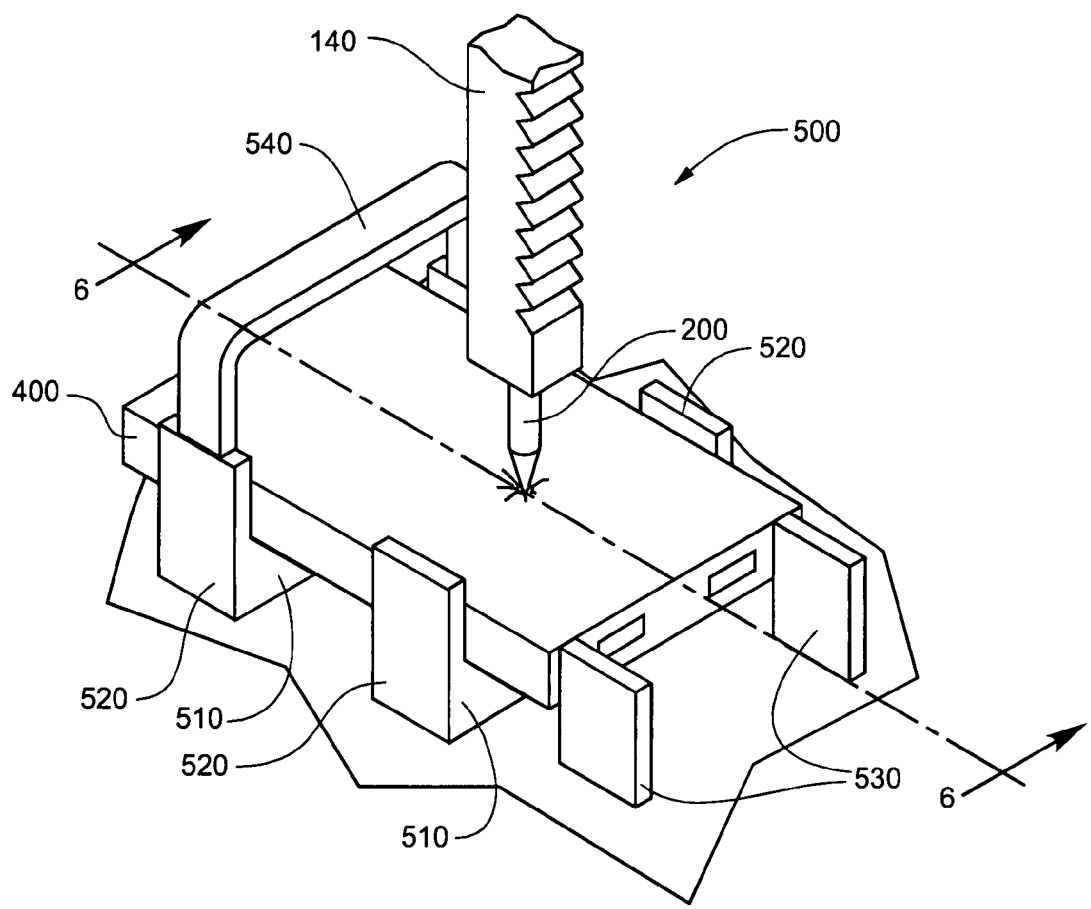
FIG. 4 is a perspective view of a portion of the present invention with the safety shield removed, and with the hardened point piercing the outer shell of the hard disk case.

As shown in FIGS. 2-4, the hard disk 400 rests on a support mechanism 500 within the safety shield 300. The purposes of the support mechanism 500 are to place the hard disk 400 closer to the point 200, to prevent any significant movement of the hard disk 400 during operation of the press 100, to position the hard disk 400 so that the point 200 will deform the platters 410 (not shown) within the hard disk 400, and to assist in the extraction of the point 200 should it become stuck within the hard disk 400.

To accomplish these purposes, the support mechanism 500 includes at least one bottom support 510, a plurality of side supports 520, at least one rear support 530, and at least one restraining ring 540. In the pictured embodiment, two side supports 520 are positioned on each side of the support mechanism, with four bottom supports 510 stretching between the side supports 520. The bottom supports 510 together form a resting surface 512 upon which the hard disk 400 rests. In the displayed embodiment, the bottom supports 510 are positioned so that the point 200 is positioned above the empty space between two of the bottom supports 510, with the resting surface 512 high enough that the point 200 is able to approach the plane formed by the resting surface 512. This allows the point 200 to cause deformation in the bottom of the hard disk 400 without that deformation being directly resisted by a bottom support 510 directly under the point 200. This assists in both the deformation of the platters 410 within hard disk 400 and lengthens the lifespan of point 200.

The rear supports 530 prevent a hard disk 400 from being too far rearward in the safety shield 300. Although two rear supports 530 are shown in the Figures, it would be possible to accomplish the same function with a single rear support 530. As shown in FIG. 4, the rear supports 530 work together with the side supports 520 to ensure that the hard disk 400 will be positioned so that the point 200 will enter the hard disk 400 and encounter the platters 410. Without these positioning mechanisms, the point 200 may impact only the central spindle or the peripheral corners where the platters are not found. Of course, the present invention would work without the positioning mechanisms 520-530 as long as the user properly positions the hard disk 400 on the support mechanism 500 under the point 200. If the device 10 is to be used with hard disks 400 of different sizes, the positioning mechanisms 520-530 can be positioned solely for the largest expected hard disk size. Alternatively, an alterative positioning mechanism can be designed into the bottom support 510. One alternative would be indents in the bottom support 510 sized to help prevent inadvertent movement for a smaller-sized hard disk 400.

The restraining ring 540 passes above the hard disk 400 and servers to prevent significant upward movement of the hard disk 400. As shown in the figures, the restraining ring 540 passes completely from one side of the hard disk 400 to the other. Alternatively, the restraining ring 540 could be less than continuous, with a partial gap above the hard disk 400, so long as a portion of the restraining ring 540 exists above the disk 400. Without the restraining ring 540, the hard disk 400 may become stuck on the point 200 after insertion. When the arm 110 of the arbor press 100 is rotated clockwise to bring the point 200 upward, the hard disk 400 would also rise upward and would impact the top of the safety enclosure 300. While the safety shield 300 would hold disk in place and thereby allow the extraction of the point 200 from the hard disk 400, repeating this action multiple times would cause significant stress and therefore a shortened lifespan for the clear plastic safety enclosure 300. To avoid this, a strong, preferably metallic restraining ring 540 prevents the rising hard disk from impacting the shield 300, thereby allowing easy extraction of the point 200 and expanding the lifespan of the safety shield 300. The restraining ring 540 is shown extending from one side support 520 to another. Other alternatives would be equally effective, such as simply forming the side supports 510 to wrap around the top of the hard disk 400 without meeting in the middle, or mounting the restraining ring 540 directly to the base or platen 150 of the arbor press 100 and not to the side supports 510.

As already mentioned above, the supporting mechanism 500 and its components 510-540 support the bottom of the hard disk 300, positions the hard disk, and prevents the hard disk from impacting the safety screen during the extraction of point 200. These functions could be accomplished by using a single piece support rather than using the separate components 510-540 described above. In fact, by combining the supporting mechanism 500 with the base 150 of the arbor press 100, a simplified construction for the whole device 10 could be achieved.

Method 600

Figure 5:
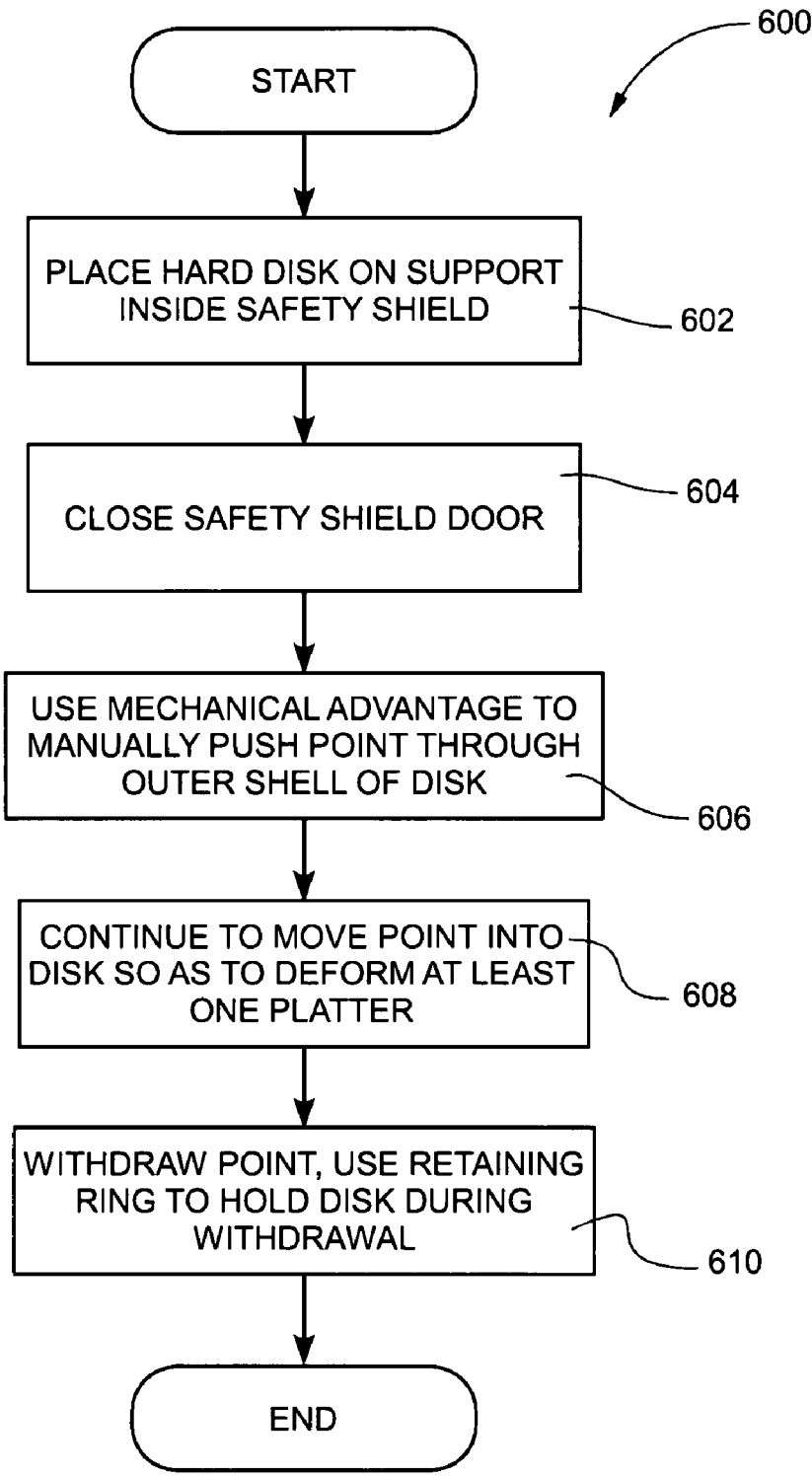
FIG. 5 is a flow chart showing the method used by the present invention.

The present invention apparatus 10 is used according to the method 600 shown in FIG. 5. The method 600 starts at step 602 by placing the hard disk 400 on the support mechanism 500 inside safety shield 300. The safety shield door 310 is then closed in step 604. At this point, the only opening in the safety shield 300 is opening 340, thereby ensuring that any flying debris stemming from the destruction of hard disk 400 will be contained within the safety shield 300.

Figure 6:
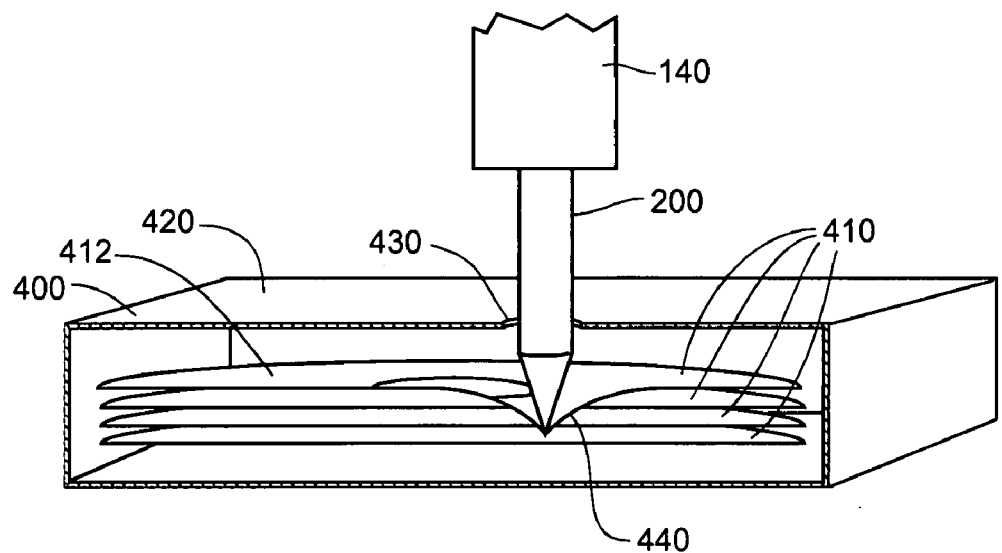
FIG. 6 is a cut-away view of the present invention shown in FIG. 4 along line 6-6.

The next step 606 uses the mechanical advantage gained from press 100 to press the point 200 through the top aluminum shell 420 of the hard disk 400, which is shown in FIG. 6. This top shell 420 is relatively thin and is punctured completely by the point 200 thereby forming a hole 430 through which the point 200 passes. As the point 200 continues to move into the disk 400 in step 608, the point encounters the various platters 410 on which the actual data held by the hard drive 400 is stored. The point 200 does not need to puncture the platters 410 in order to render the platters 410 and hence the entire disk 400 unreadable. Rather, all that is necessary is that the platters be deformed, which is shown by deformation 440 in FIG. 6. Ideally, the point 200 will deform all of the platters 410 in the hard disk 400, although only the top platter 412 needs to be significantly deformed in order to render the hard disk practically unreadable.

This process of deforming the platters 410 of a hard disk 400 does not remove the digital, magnetic information that is stored on the disk 400. It does, however, prevent the reading of the disk by spinning the disks across read heads, since the deformation in the platters 410 does not allow the magnetic read heads to be inserted between the disks. Since using read heads that pass between the platters 410 is the only practical way of recovering data off of the hard disk 400, the created deformation 440 effectively prevents access to the data.

The process 600 continues with the extraction of the point 200 from the hard disk in step 610. When using the arbor press 100, this extraction is accomplished by moving the arm 110 in a clockwise direction. Since the hole 430 is only as large as the point 200, it is to be expected that the top shell 420 of the hard disk 400 will frequently stick to the point 200 as it moves upward. To prevent the hard disk 400 from being pressed against the top 330 of the safety shield 300, the restraining ring 540 is positioned to prevent upward movement of the hard disk 400. By doing so, the point 200 can be extracted and the process 600 is completed.

To ensure that the platters 410 are properly deformed, it would be possible to remove the hard disk and replace it back in the device 10 in a new position. This would allow the creation of a new hole 430 and a new area of deformation 440 to be placed in the disk 400. In fact, it is possible to place the disk 400 upside down on the support mechanism 500 so that the point 200 enters the disk 400 through its bottom surface. Since this generally requires that the point 200 penetrate a brittle plastic bottom surface and a circuit board before the platters 410 are encountered, this is not the preferred practice. Nonetheless, the present invention would be equally effective when used in this manner and penetrating both the top and bottom of the hard disk 400 would certainly ensure that the data would be extremely difficult to recover.

It should be noted that the present invention is equally effective at destroying hard disks 400 that utilize brittle, shatter-prone platters made from a glass substrate instead of deformable aluminum. When point 200 pierces hard disk shell 420 and encounters these glass platters 410, the point 200 causes the platters 410 to shatter and thereby prevents any further attempt at reading data from the disk 400.

Penetrating Point 200

Figure 7:
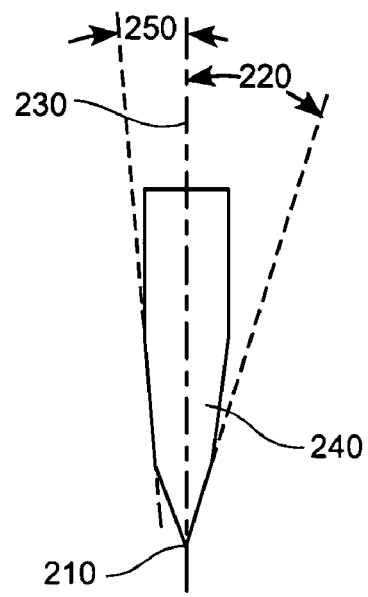
FIG. 7 is a plan view of the penetrating point of the present invention.

As can be seen in FIG. 7, the penetrating point 200 has a conically shaped tip 210 formed with an angle 220 from the axis 230 of less than thirty-five degrees (35). By using a conical tip 210 having such an angle 220, the tip 210 is better able to pierce the aluminum outer casing 420 of the hard disk 400. A broader tipped point 200 would not easily penetrate the casing 420, but would instead act initially to only deform the casing 420. Since the goal is to deform the platters 410, the casing 420 would have to undergo significant deformation before this goal is achieved. This would require that the press 100 apply significantly more force than if the point 200 is formed to easily penetrate the outer casing. While the press 100 would be able to apply the necessary force, it would require more force from the user and may cause the device 10 to be uncomfortable to use for slightly-built users.

It is not necessary that the point 200 penetrate through the platters 410—deformation is the goal. Consequently, the angle 220 of the tip 210 does not need to be too narrow. The preferred embodiment uses an angle from normal of approximately 20 degrees, with the best angle believed to be between 10 and 30 degrees. Of course, with a sufficiently thin point 200, the angle may be irrelevant as the power of the press 100 would be sufficient to allow the point 200 to penetrate the casing 420. In addition, the preferred embodiment has a second angled portion 240 of a smaller angle 250 from axis 230 (approximately five degrees). This portion assists in the point 200 entering and exiting the hole 430 created by the tip 210. The efficiency gain from this second angled portion 240 is uncertain, and it is possible that the device 10 would be similarly efficient without this portion 240.

The point 200 is preferably made of a material sufficiently hard to penetrate the aluminum shell 420 and deform the platters 410 of hard disk 400. In one embodiment the point 200 is solid steel, although other materials and combinations of materials for making a penetrating point are known to those of skill in the art and are within the scope of the present invention.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A hard disk destruction apparatus comprising:
    a) a press having an actuator arm with a rotational range of movement at an extremity of the arm of greater than one foot, the actuator arm moving a moving ram with an at least ten times mechanical advantage;
    b) a penetrating point attached to the ram so as to move linearly when the actuating arm is moved;
    c) a safety shield forming an interior, the safety shield having an opening through which the penetrating point enters the interior; and
    d) a support mechanism within the interior of the safety shield.

2. The apparatus of claim 1, wherein the support mechanism further comprises a plurality of bottom supports forming a resting surface, and wherein the bottom supports are positioned so that the point approaches the resting surface between two of the bottom supports.

3. The apparatus of claim 2, wherein the support mechanism further includes two side supports and a rear supports.

4. The apparatus of claim 3, further including a hard drive positioned so as to rest on the resting surface abutting the rear support between the two side supports, such that platters within the hard drive are positioned under the penetrating point and that the central spindle is not positioned under the penetrating point.

5. The apparatus of claim 4, wherein the support mechanism further comprises a restraining portion that extends above an area of the resting surface between the two side supports, whereby the restraining portion is positioned to resist the upward movement of the hard drive.

6. The apparatus of claim 1, wherein the press converts rotational motion of the actuator arm, which turns a circular pinion, into linear motion of the moving ram.

7. The apparatus of claim 1, wherein the safety shield is transparent so as to allow a visual review of the interior of the safety shield.

8. The apparatus of claim 1, wherein the safety shield has a front door which opens to allow access to the interior of the safety shield and which closes to provide protection against flying debris leaving the interior of the safety shield.

9. The apparatus of claim 1, wherein the penetrating point is made from steel and has a conical tip with an angle from its axis between 10 and 30 degrees; and further wherein the arm has a handle grip.

10. A hard disk destruction apparatus comprising:
   a) a point sufficiently hard to penetrate an aluminum casing;
   b) physical means for manually moving the point from a rest position to a second position, the physical means operating only by manual power thereby using no electricity or other fuel, the point being affixed to the physical means;
   c) a safety shield forming an interior and having a surface portion through which the point enters the interior;
   d) a hard disk supporting mechanism within the interior that supports supporting a hard disk under the point, the hard disk support mechanism has two side supports;
   e) a hard disk resting on the supporting mechanism adjacent the two side supports, such that when the point is in the first position, the point is vertically above the hard disk, and when the point is in the second position, the point has penetrated an outer casing of the hard disk and has penetrated, shattered, or deformed a plurality of platters within the hard disk; and
   f) a restraining portion passing above the hard disk from one side support to the other to resist upward movement of the hard disk during extraction of the point.

11. The apparatus of claim 10, wherein the means for manually moving is a three-ton arbor press.

12. The apparatus of claim 10, wherein the means for manually moving is a slide hammer.

13. The apparatus of claim 10, wherein the hard disk support mechanism has a third side support adjacent the hard disk, such that the three side supports help locate the hard disk under the point.

14. The apparatus of claim 13, wherein the hard disk support mechanism has a plurality of bottom supports, such that a gap exists between the bottom supports directly under the point.

15. A method for destroying the data retrieval ability of a hard disk comprising:
   a) positioning a hard disk with internal platters on a supporting mechanism underneath a penetrating point;
   b) manually operating a press without electricity or other fuel so as to move the penetrating point downward toward the hard disk;
   c) penetrating the hard disk with the point so as to form a hole in the hard disk casing through which the penetrating point passes;
   d) physically altering one of the platters within the hard disk by pressing the point into the platters;
   e) manually operating the press so as to extract the point from the hard disk while restraining the hard disk against movement during extraction of the point by use of a restraint attached to the supporting mechanism.

16. The method of claim 15, wherein the step of positioning the hard disk further comprises:
   i) opening a door to a safety shield;
   ii) positioning the hard disk on the supporting mechanism within the interior of the safety shield; and
   iii) closing the door of the safety shield.

17. The method of claim 16, wherein the step of manually operating the press further comprising moving the penetrating point through an opening in the top surface of the safety shield.

18. The method of claim 15, wherein the step of physically altering one of the platters further comprises deforming or shattering the one platter.

19. A hard disk destruction apparatus for destroying the platters of a hard drive comprising:
   a) a press having an actuator arm moving a ram with an increased mechanical advantage;
   b) a penetrating point attached to the ram so as to move linearly into the hard drive when the actuating arm is moved;
   c) a safety shield forming an interior, the safety shield having an opening through which the penetrating point can enter the interior; and
   d) a mechanical restraint within the interior of the safety shield positioned above a resting area for the hard drive, wherein the mechanical restraint resists the upward movement of the hard drive to prevent the hard drive from impacting the safety shield during extraction of the penetrating point.

20. The hard disk destruction apparatus of claim 19, wherein the press is a mechanical press.

* * * * *

UNITED STATES PATENT AND TRADEMARK OFFICE
CERTIFICATE OF CORRECTION

| | | |
|---|---|---|
| PATENT NO. | : 7,937,982 B2 | Page 1 of 1 |
| APPLICATION NO. | : 11/983299 | |
| DATED | : May 10, 2011 | |
| INVENTOR(S) | : Carl Aoki | |

It is certified that error appears in the above-identified patent and that said Letters Patent is hereby corrected as shown below:

Column 3
Line 35
Delete "dosed" and insert --closed--, therefor.

Column 6
Line 6
Delete "(35)." and insert --(35°).--, therefor.

Signed and Sealed this
Second Day of October, 2012

David J. Kappos
*Director of the United States Patent and Trademark Office*